July 12, 1932.  T. W. B. WATLING  1,866,871
WEIGHT RECORDING MACHINE
Original Filed Dec. 2, 1926  7 Sheets-Sheet 1

Inventor:
Thomas W. B. Watling
By Fisher, Towle, Clapp & Soans,
Attys.

July 12, 1932.  T. W. B. WATLING  1,866,871

WEIGHT RECORDING MACHINE

Original Filed Dec. 2, 1926  7 Sheets-Sheet 5

Inventor:
Thomas W. B. Watling
By Fisher, Towle, Clapp & Soans
Attys.

July 12, 1932.  T. W. B. WATLING  1,866,871
WEIGHT RECORDING MACHINE
Original Filed Dec. 2, 1926   7 Sheets-Sheet 6

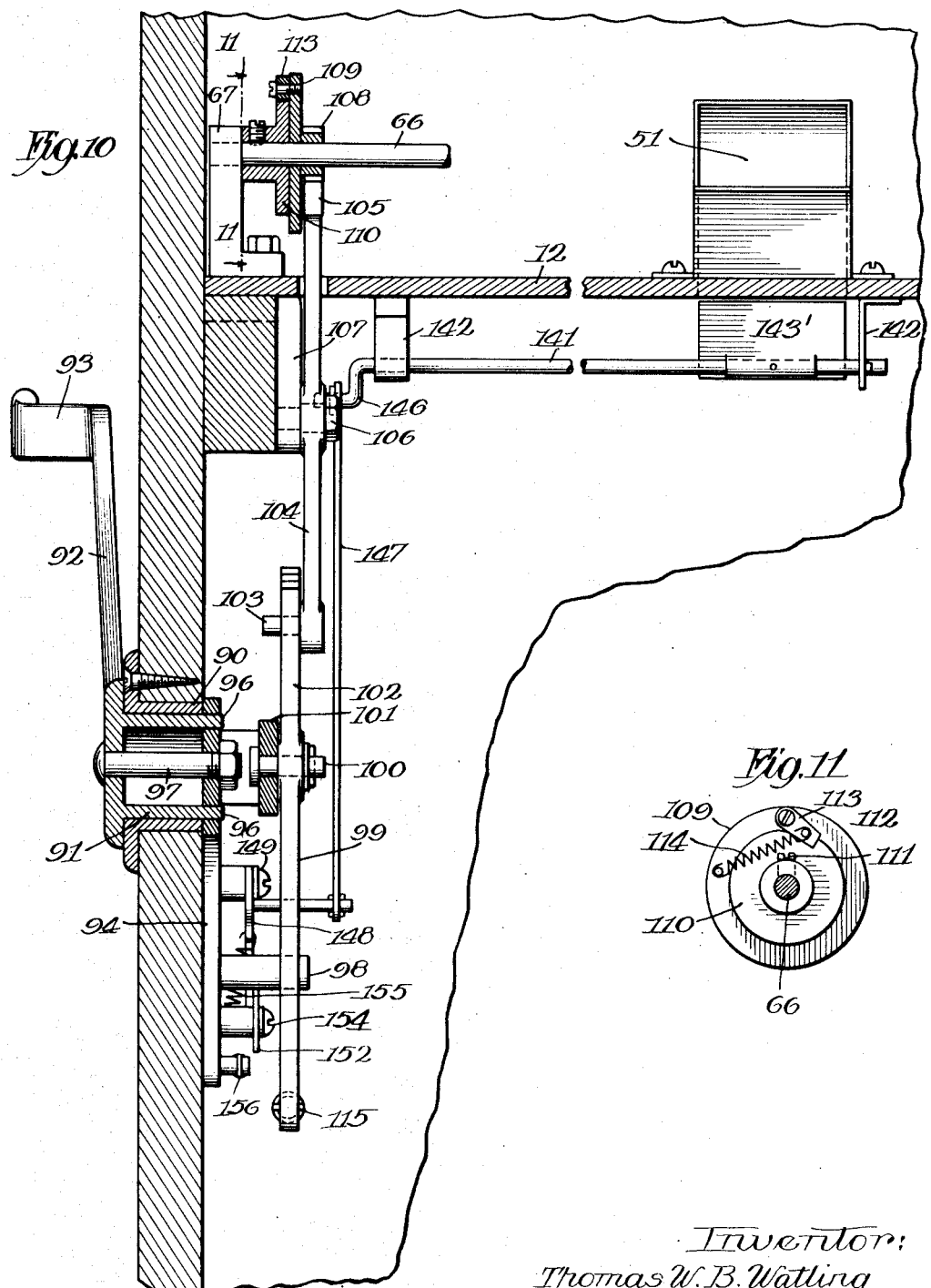

Patented July 12, 1932

1,866,871

UNITED STATES PATENT OFFICE

THOMAS W. B. WATLING, OF CHICAGO, ILLINOIS

WEIGHT RECORDING MACHINE

Application filed December 2, 1926, Serial No. 152,127. Renewed November 18, 1931.

This invention relates to weight recording machines and has reference more particularly to machines of that type wherein the weight of the customer is recorded either on a ticket, or a package of merchandise, such as gum, and is delivered from the machine by coin-controlled dispensing mechanism.

In numerous machines of this type the recording and dispensing mechanism is actuated by the weight of the customer. This leads to inaccuracy due to the fact that, since part of the weight is employed to operate the printing and dispensing mechanism, less than the total weight is applied to the setting of the recording wheel or other device carrying the recording type. In other known machines the printing and dispensing mechanism is operated independently of the weight of the customer, usually by a spring which is preliminarily put in tension through a knob or lever manipulated by the customer. The machine of my present invention relates to the latter class, and has for its general object to provide an improved and simplified machine which will be in capable of improper or partial manipupulation. Another object of the invention is to provide a machine of the type specified wherein the customer, in order to obtain from the machine the ticket or package on which his weight has been recorded must first place in tension the operating spring of the printing and dispensing mechanism.

While the machine of the present invention, especially with relation to the last stated object of the invention, may be employed to dispense either tickets or wrapped merchandise with the weight printed thereon, I have herein shown the invention embodied in a machine adapted to record the weight on a continuous strip or tape and equipped with an automatic ticket-severing mechanism; and other more specific objects of the invention are to provide in such a machine improved tape feed mechanism and improved tape severing mechanism.

Still other objects and attendant advantages of the invention will be apparent to persons familiar with machines of this character from the following detailed description, taken in connection with the accompanying drawings wherein I have illustrated one practical embodiment of the invention, and in which—

Fig. 10 is a vertical section at right angles to that of Fig. 9 and in the plane of the line 10—10 of Fig. 9;

Fig. 11 is a sectional detail on the line 11—11 of Fig. 10.

Figure 1:
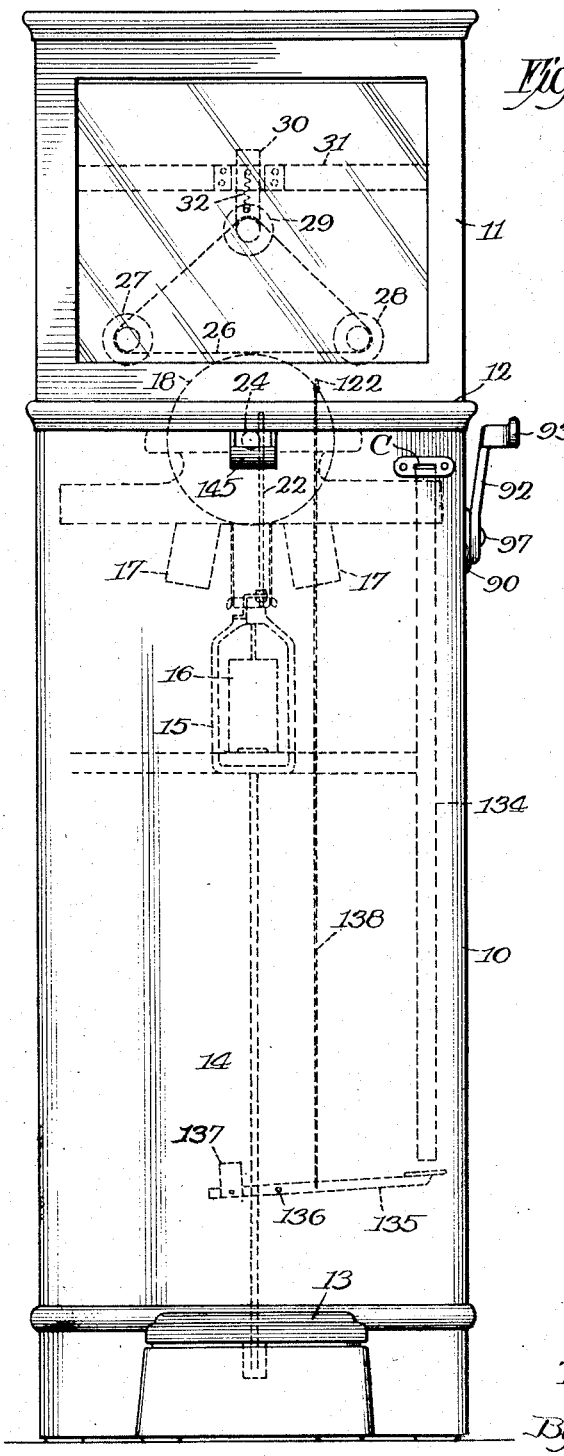
Fig. 1 is a front elevation of the machine, indicating somewhat diagrammatically several of the principal parts of the coin-controlled weighing and printing mechanisms.

Referring to the drawings, Fig. 1 shows the cabinet of the machine comprising a lower portion 10 housing mainly the weighing mechanism, and an upper portion 11 housing the feeding, printing and dispensing mechanisms, the two being separated by a horizontal partition plate 12. 13 designates the usual platform, 14 the connecting rod, 15 the frame, 16 the dash pot, and 17 the counterweights. These parts are of known and conventional form, and the specific structure thereof forms no part of the present invention.

Figure 4:
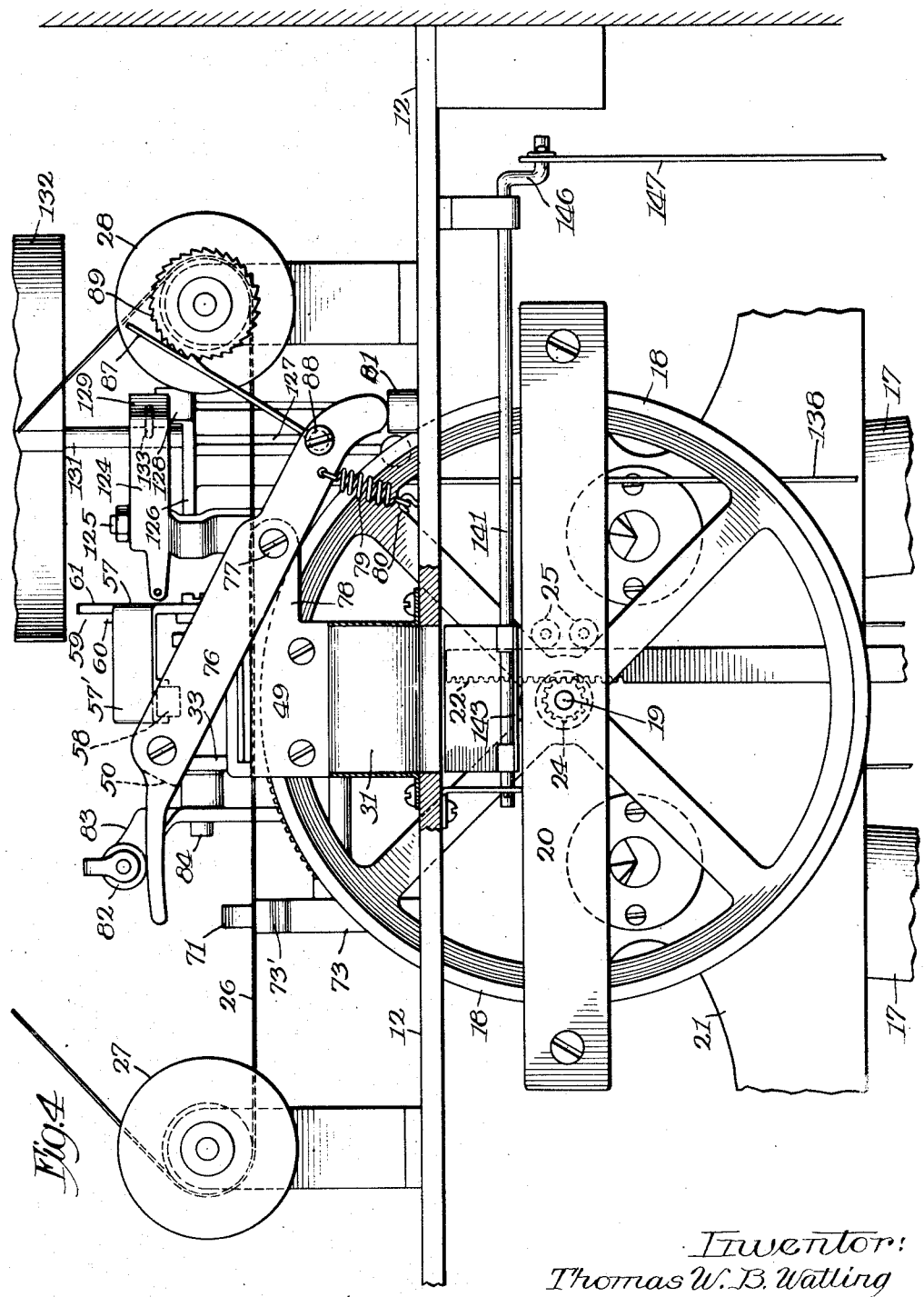
Fig. 4 is an enlarged front elevation, partly in vertical section, of the printing and tape severing mechanism.

A type wheel 18, from which impressions are taken on the ticket tape or the wrapper of any article to be delivered by the machine, as best shown in Fig. 4, is pivotally mounted at 19 in and between a pair of supporting bars 20 in turn mounted on brackets 21 supported from the casing. The type wheel 18 is selectively positioned from the platform 13 by the following mechanism. A rack 22 is connected by means of a bracket 23 (Fig. 6) to the frame 15. The rack co-operates with a pinion 24 on the type wheel shaft, and may be maintained in engagement with said pinion by a pair of rollers 25. An inking ribbon 26 is mounted on a pair of lower spools 27, 28, and a central upper spool 29, the lower horizontal lap of said ribbon extending across the top of the periphery of the type wheel 18. Suitable tension is maintained on the inking ribbon 26 by mounting the upper roller 29 in a yoke 30 (Fig. 1) slidably engaged with a cross-bar 31 in the upper cabinet section 11 and drawn upwardly by a pull spring 32. Any other suitable or convenient means for tensioning the inking ribbon may be employed.

Figure 2:
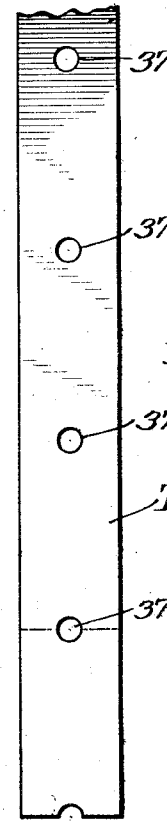
Fig. 2 is a plan view of a portion of the printing strip or tape on which the weight is recorded.
Figure 5:
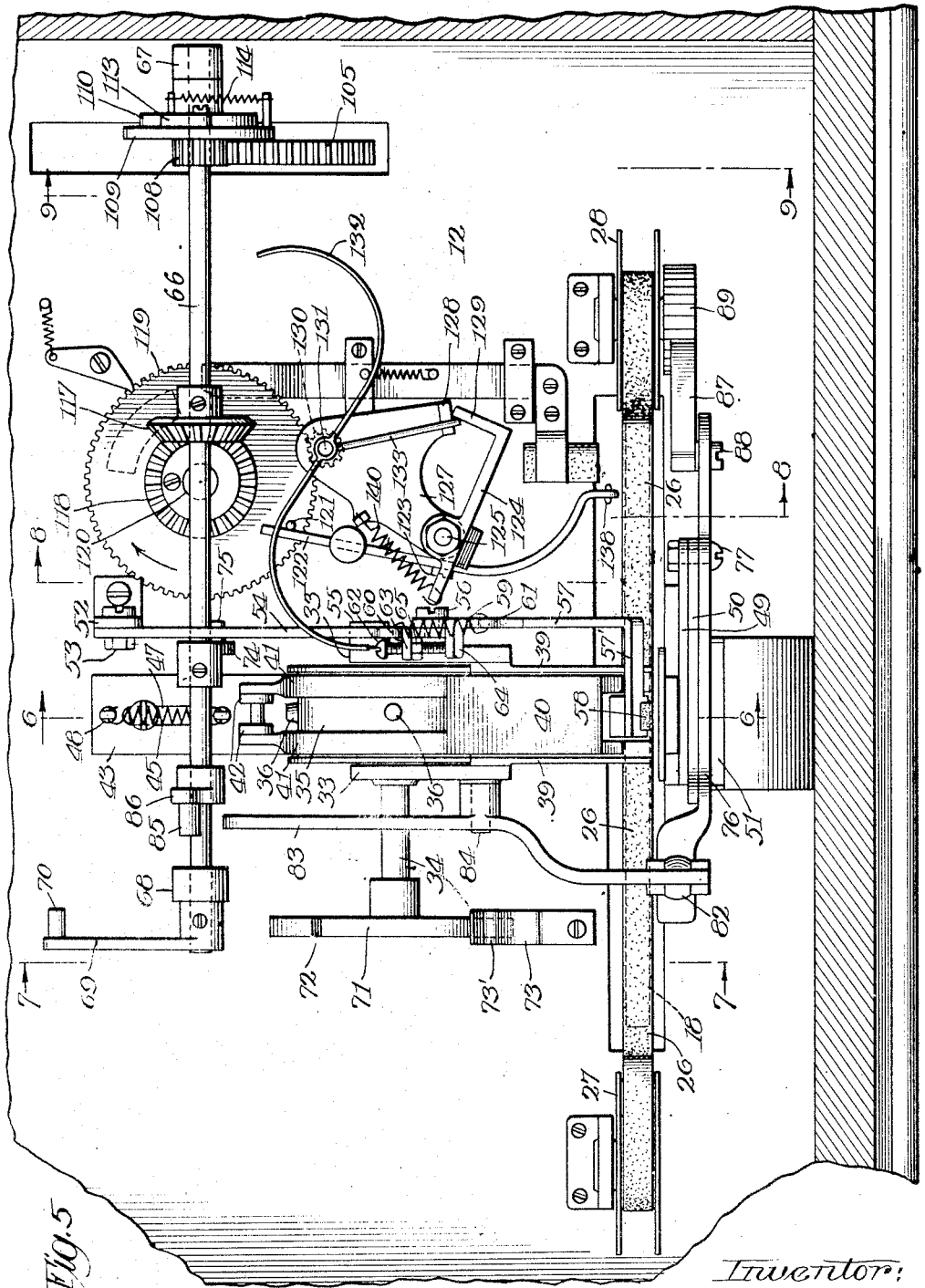
Fig. 5 is a top plan of the mechanisms shown in Fig. 4.

On the base plate 12 are mounted a pair of parallel upstanding brackets 33 (Figs. 5 and 6) in which is journaled a shaft 34, keyed on which shaft, between the brackets 33, is a feed wheel 35 equipped on its periphery with a plurality of uniformly spaced lugs or pins 36. T designates the ticket tape, ordinarily consisting of a continuous strip of pasteboard, a fragment of which is shown in Fig. 2. Said strip is provided with central apertures 37 spaced at distances corresponding to the pins 36 of the feed wheel and engaged by the latter in the manner clearly shown in Fig. 6. Mounted on and between the upper portion of the brackets 33 is a trough-shaped member comprising a longitudinally slotted bottom plate 38 and side flanges 39 by which the tape is supported and guided beyond the feed wheel 35. 40 indicates a block overlying the tape in the guide chute to prevent the tape from buckling as it is advanced by the feed wheel. This block 40 is formed with a rearwardly and downwardly curved stem or shank 41 that is longitudinally slotted for the passage of the pins 36 of the feed wheel as shown in Fig. 5 and at its lower end is mounted to swing on a pair of pivot lugs 42 carried by a plate 43 resting on the partition plate 12. To insure that the ticket tape shall hug the feed wheel 35, the lower end of the shank 41 is formed with a cam shoe 44 clearly shown in Fig. 6 that presses against the ticket tape under the pull of a light spring 45 anchored at one end to a post 46 extending through a slot 47 in the plate 43 and at its other end to a post 48 mounted on the rear end of the plate 43. By reason of the described construction the block 40 constituting the top wall of the tape guide chute can be swung upwardly and rearwardly to facilitate the initial threading of the tape on the feed wheel. The forward end of the chute 38 is cut away at a point above the type wheel 18 to provide clearance for the printing, and beyond the type wheel the tape passes over the lower stationary member 49 of a shear cutter, the upper and movable blade of which is indicated at 50. From the cutter the severed ticket drops into a gravity discharge chute 51 where it is temporarily caught and held by an arresting device, hereinafter described, prior to its final delivery from the machine.

Figure 6:
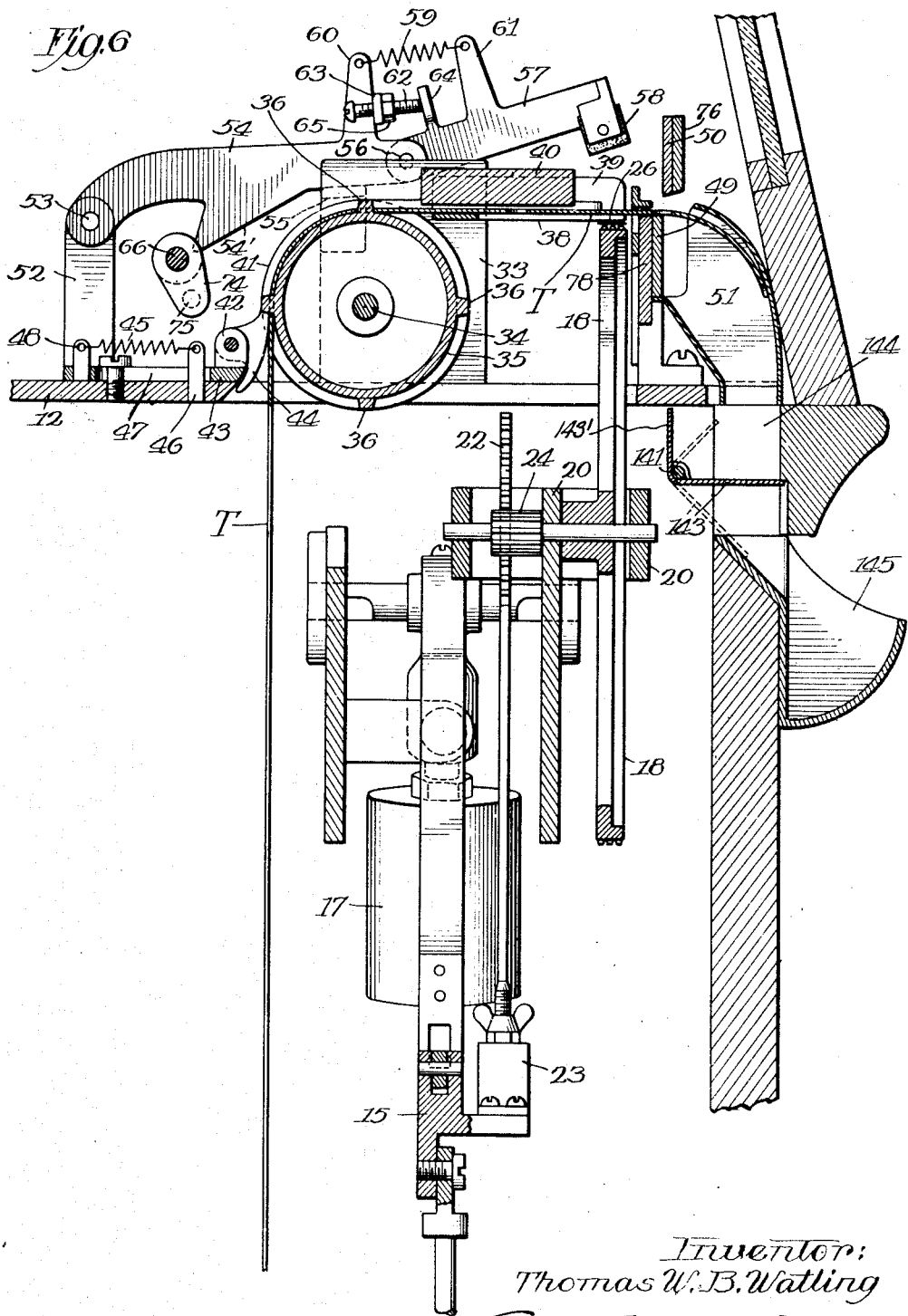
Fig. 6 is a vertical section taken in the plane of the line 6—6 of Fig. 5.

A printing mechanism preferably of the momentum type, comprises the following parts. Referring to Figs. 5 and 6, on the upper end of a post 52 mounted on the plate 12 is pivoted at 53 an arm 54 that extends forwardly and normally rests at its lower edge on a stop 55 extending laterally from one of the bracket plates 33. To the forward end of the arm 54 is pivoted at 56 the hammer arm 57 the forward end of which is bent laterally, as shown at 57' in Fig. 5 and carries the rubber or other hammer head 58 suitably mounted thereon. The arm 57 is normally maintained in the elevated position shown in Fig. 6 through the pull of a light tension spring 59 connected between a lug 60 on the back of the arm 54 and a lug 61 on the back of the arm 57, and the extent of its elevation may be determined by an adjusting screw 62 threaded through an ear 63 on the lug 60 and abutting against a lug 64 on the back of the arm 57; said screw being locked in adjusted position by a nut 65.

Figure 7:
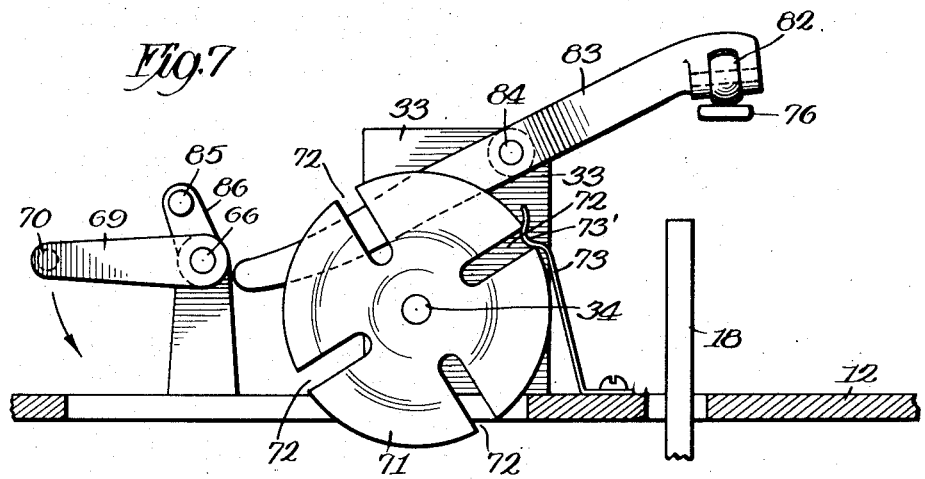
Fig. 7 is an elevation of a part of the tape feed and cutter-actuating mechanisms viewed from the plane of the line 7—7 of Fig. 5.

Describing next the means for actuating the feed wheel 35 and the hammer of the printing mechanism, 66 designates a drive shaft journaled at or near its ends in posts 67 and 68 (Fig. 5) on the supporting plate 12. Fast on one end of this shaft 66 is an arm 69 carrying at its free end a laterally extending pin 70. Referring to Figs. 5 and 7, fast on one end of the feed wheel shaft 34 is a disc 71 formed with four radial slots 72 ninety degrees apart. The disc 71 is so located relatively to the pin 70 that at each revolution of the shaft 66 in the direction indicated by the arrow in Fig. 7 the pin will enter one of the slots 72 and rotate the disc 71 and the tape feed shaft 34 through a quarter revolution. A spring dog 73 drags on the periphery of the disc 71 and has a bent portion 73' that co-operates with the open ends of the slots 72 to prevent overthrow of the disc 71, as clearly shown in Fig. 7.

Also fast on the shaft 66 is an arm 74, Fig. 6, carrying a laterally extending pin 75 that, once at each revolution of the shaft 66 wipes over a cam incline 54' formed on the lower side of the hammer arm 54, thereby raising said arm on the pivot 53 and allowing it to drop suddenly as the pin passes off the incline, whereby the hammer arm 57 drops under its momentum against the pull of the spring 59 sufficiently to print the tape.

Referring next to the mechanism for actuating the cutter from the shaft 66, by reference to Figs. 4 and 5 it will be seen that the swinging cutter blade 50 is mounted on the inner side of a blade holder 76, and that both the blade and holder are pivoted at 77 on a stationary bracket 78 to the front face of which the fixed blade 49 is attached. The swinging blade holder 76 is normally maintained in the elevated position shown in Fig. 4 by a pull spring 79 anchored to a lug 80 on the plate 12, and the extent of its upward swing is limited through contact of the lower end of the blade holder with a stop lug 81 on the plate 12. The elevated end portion of the blade holder is engaged by a roller 82 (see Figs. 5 and 7) mounted in one end of a lever 83 that is fulcrumed at 84 on one of the bracket plates 33. The rear or tail end of the lever 83 extends into the path of a pin 85 mounted in the free end of an arm 86 fast on the drive shaft 66. Once at each revolution of the shaft 66 the lever 83 is actuated to in turn actuate the movable cutter blade through a severing stroke; the normal or idle position of the parts being restored by the pull spring 79.

In connection with the movable blade holder 76 I have shown in Figs. 4 and 5 a simple device for imparting an intermittent feed movement to the inking ribbon 26; this consisting of a gravity pawl 87 pivoted at 88 on the lower end portion of the blade holder 76 and engaged with a ratchet disc 89 fast on the shaft of the ribbon spool 28.

Referring next to the mechanism for rotating the drive shaft 66, the motive agent consists of a spring which, in the operation of the machine, is tensioned by hand; and, in the preferred form of the machine herein shown, is tensioned by each customer preliminary to the use of the machine by the next customer.

Figure 9:
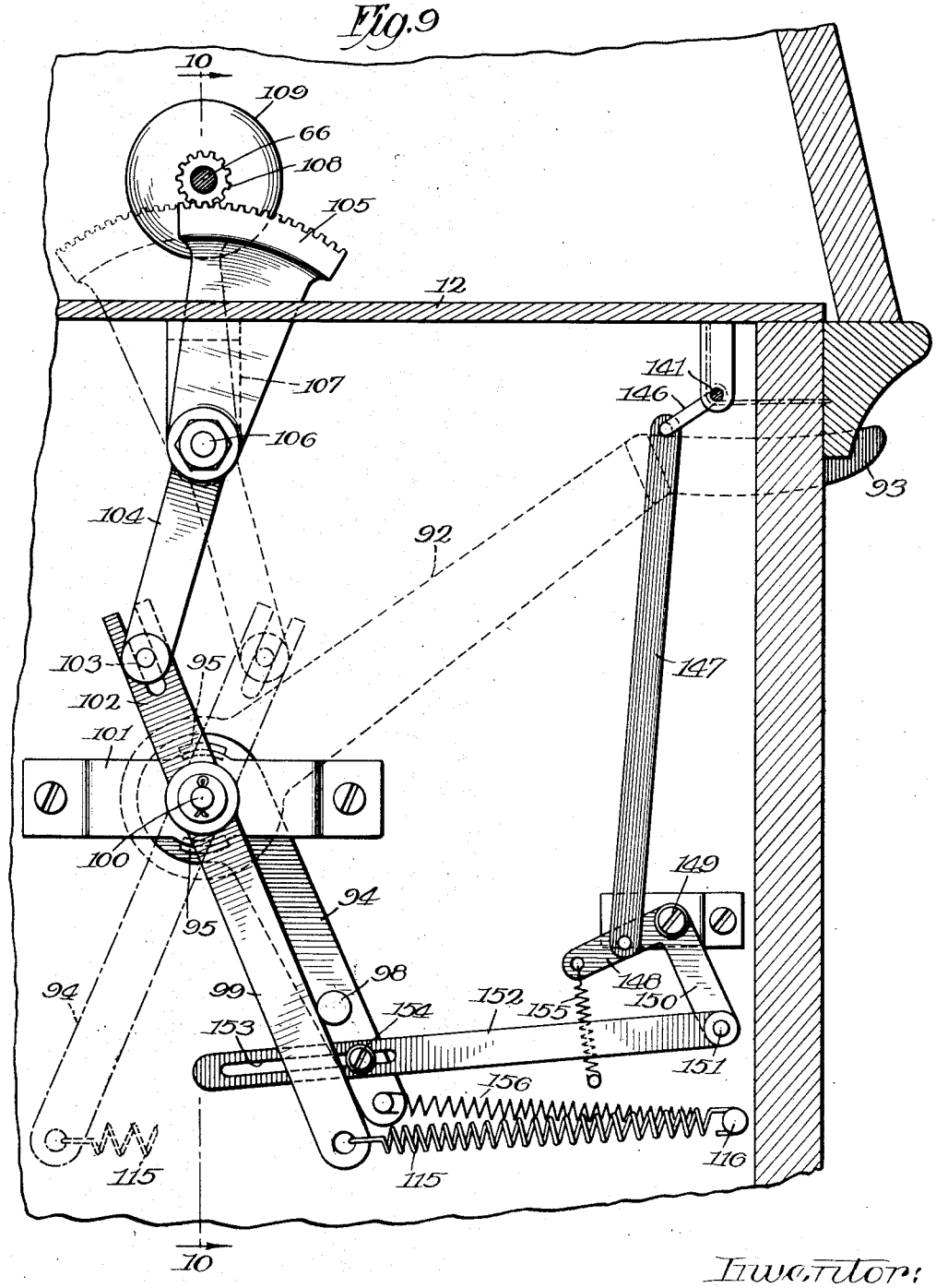
Fig. 9 is a vertical section taken in the plane of the line 9—9 of Fig. 5.

Referring mainly to Figs. 1, 9, and 10, in a side wall of the lower section 10 of the cabinet is mounted a bearing member 90 in which is journaled the hollow hub 91 of an operating lever 92 equipped at its free end with a handle 93. Attached to the inner end of the hub 91 is a depending arm 94, the upper end of said arm being formed with arcuate slots 95 engaged by correspondingly shaped tongues 96 on the inner end of the hub 91 whereby the arms 92 and 94 are locked to constitute in effect an elbow lever, the arm 94 being secured on the hub 91 by a bolt 97. On the arm 94 is a laterally extending pin 98 that lies across the path of movement of the lower arm 99 of a second lever that is mounted to swing on a pivot pin 100 in turn mounted in a bracket 101 that is attached to the inner side of the side wall of the cabinet. The upper arm 102 of the last-named lever has a forked upper end which straddles a lateral pin 103 in the lower end of an arm 104. The arm 104 is an integral extension of a gear segment 105 that is pivoted on a pin 106 projecting from a bracket 107 secured to the under side of the base plate 12.

The gear segment 105 meshes with a pinion 108 that is secured to one side of a disc 109. Both the pinion 108 and disc 109 are free to rotate on the shaft 66. Another disc 110, see Fig. 11, is secured to the shaft 66 as by means of a set screw 111 and is formed with a single ratchet tooth 112 adapted to be engaged by a pawl 113 pivotally mounted on the disc 109, and a tension spring 114 connected between the disc 109 and the side of the pawl draws the latter into engagement with the ratchet tooth 112.

Referring to Fig. 9, to the lower end of the lever arm 99 is connected a pull spring 115 anchored to a pin 116 in the side wall of the cabinet. This spring 115 constitutes the motor spring for driving the shaft 66 through the above described connections. When the handle lever 92 is fully depressed to stretch and tension the spring 115, the gear segment 105 causes the pinion 108 and disc 109 to rotate clockwise viewing Fig. 9, and counterclockwise viewing Fig. 11. When the pinion 108 and disc 109 are thus rotated, the pawl 113 will leave the tooth 112 and will travel around the periphery of the disc 110 until a full revolution has been made, when it will again drop into the notch at the tooth 112. If then the handle be released, the reaction of the motor spring 115 will reverse the direction of drive of the disc 109, and the shaft 66 will be driven to actuate the feed mechanism, printing mechanism and the tape severing mechanism through the operating connections already described.

It is noted that the spring-operated lever 99 and gear segment 105 actuate the shaft 66 through the medium of the pawl 113 and the single toothed ratchet 110 upon the forward or working stroke of the lever. Also, the return movement of the lever, effected by the manually operable arm 92 to store energy in the spring, must be completed to properly engage the pawl 113 with the single toothed ratchet. Otherwise the gear segment is inoperative.

In the intended use of the machine, the motor spring 115 having been tensioned by depressing the handle lever 92, the shaft 66 operating the feed, printing and severing devices is locked against operation until released manually or by a deposited coin. In the drawings I have shown a coin-actuated tripping mechanism. Briefly describing this mechanism, which is shown in Figs. 1, 4, 5 and 8, a bevel gear 117 fast on the shaft 66 meshes with a bevel gear 118 which is rigidly and concentrically attached to a spur gear 119, and these two gears are rotatably mounted by means of a pivot shaft 120 on the base 12. A pin 121 projecting upwardly from the gear 119 engages one end of a stop arm 122, thereby preventing rotation of the gear 119 and consequently of the shaft 66. The stop arm 122 is pivoted at 123 on a bracket 124 which in turn is pivotally mounted on a pin 125 that is secured to the base 12 and in an arm 126 on a stationary bracket 127. The tendency of the gear 119 to rotate clockwise, as indicated by the arrow in Fig. 5, is imparted through the pin 121 to the end of the stop arm 122, and through this arm to the bracket 124. To prevent such rotation of the bracket 124 I provide a stop 128 on the fixed bracket 127 which engages the end of a hook 129 on the pivoted bracket 124.

130 designates a pinion meshing with and driven by the gear 119 and fast on the shaft 131 of an air resistance governor 132. Since the pin 121 exerts considerable thrust on the trip lever 122, so that the latter might fail to be raised by a coin falling on its other end, I provide on the governor shaft 131 a radial arm 133 the free end of which is engaged by the hook 129 of the pivoted bracket 124, whereby said arm 133 in part resists the driving strain on the gear 119 and insures the free movement of the trip lever 122 under the weight of a coin.

Figure 8:
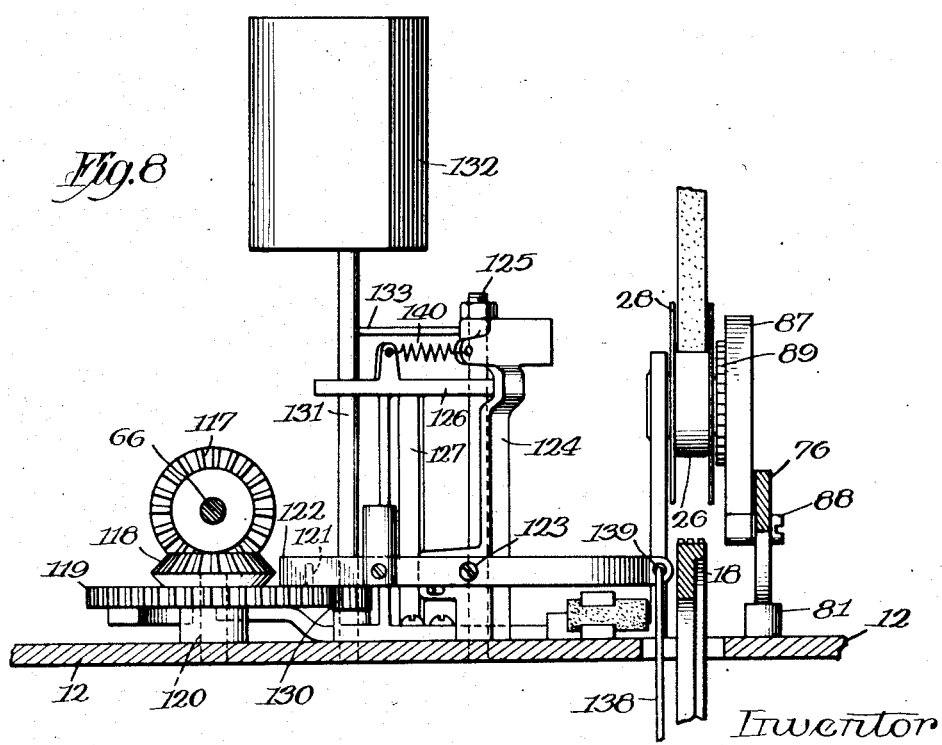
Fig. 8 is a vertical section taken on the offset line 8—8 of Fig. 5.

The stop arm or trip lever 122 is adapted to be swung on its pivot 123 by means of a coin dropped in a coin slot C (Fig. 1). The coin is guided through a suitable tube member 134 downwardly until it strikes the outer end of a lever 135 which is pivoted near its inner end at 136. The lever 135 is provided with a counterweight 137 at its inner end which normally holds the lever in an up position in which a coin striking the outer end thereof will be effective to swing its outer end downwardly. A suitable cord or wire 138 is connected at its lower end to the lever 135 forwardly of its pivot, and the upper end of said wire is connected to the inner end of the stop arm 122 as shown at 139 (Fig. 8). When the wire 138 is pulled down, due to the engagement of a coin with the outer end of the lever 135, the stop arm 122 is rocked on its pivot so that the outer end of the arm is raised above the pin 121. When this occurs, a light pull spring 140 connected between a lug on the fixed bracket 127 and a lug on the pivoted bracket 124 acts to rock the bracket 124 on its pivot pin 125 so that the raised end of the lever 122 moves over the pin 121, and the hook 129 is drawn clear of the arm 133 so that the gear 119 is then free to rotate, and the motor spring 115 then imparts rotation to the drive shaft 66, actuating the feed, printing and severing mechanisms as described.

As above stated, one object of the present invention has been to provide a machine wherein each customer, before he can receive his printed ticket, will have to prime the machine for its next operation by placing the motor spring 115 under tension. A simple mechanism for this purpose is illustrated mainly in Figs. 6, 9 and 10. Referring thereto, 141 designates a rock shaft journaled in bearing brackets 142 secured to the under side of the base plate 12, and fast on this rock shaft is a valve, preferably in the form of a shutter 143, which in its raised position shown by full lines in Fig. 6 spans a discharge passage 144 in the cabinet wall that connects the chute 51 with the delivery receptacle 145. In the lowered position of the shutter 143, shown by dotted lines in Fig. 6, the passage 144 is opened. On one end of the shaft 141 is a crank arm 146 which is connected through a link 147 to one arm 148 of a bell crank lever that is pivoted at 149 on the cabinet wall. To the other arm 150 of said bell crank lever is pivotally connected at 151 a link bar 152 having at its inner end a longitudinal slot 153. This slot is slidably engaged by a pin 154 projecting laterally from the lever arm 94 that is rigid with the handle lever 92. The elbow lever 148, 150 is normally maintained in the position shown in Fig. 9 by a pull spring 155; and the handle lever 92, after being depressed, is at once returned to raised position through the action of a pull spring 156 connecting the lower end of the lever arm 94 to the anchor pin 116.

From the foregoing it will be seen that when the handle lever 92 is depressed, during the last portion of the downward movement thereof the pin 154 through engagement with the outer end of the slot 153 will, through the described connections, actuate the rock shaft 141 in a direction to open the shutter 143 and allow the printed ticket to drop into the receptacle 145. The shutter is preferably formed with a tail-piece 143' that normally closes an opening in the rear wall of the chute, and blocks attempts to "pick" the machine.

Figure 3:
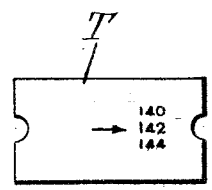
Fig. 3 is a similar plan view showing a single ticket severed from the strip and with the indicated weight appearing thereon.

From the foregoing it will also be seen that before the customer can receive his ticket, the operating handle 92 must be fully depressed. This places the motor spring 115 under tension, and said spring is locked under tension by the locking mechanism above described until the next customer deposits a coin or the trip mechanism is otherwise operated to release the drive shaft 66. In the use of a machine equipped with coin-controlled trip mechanism, the customer steps on the platform, which rotates the type wheel 18 to a weight-recording position, and he then drops a coin in the coin chute, which releases the power shaft 66; the printing, tape feeding and severing mechanisms then act in the order above named, and the ticket, with the customer's weight appearing thereon as shown in Fig. 3 drops onto the shutter 143 and is retained by the latter. The customer then depresses the handle lever 92 which retensions the motor spring 115 and at the same time operates the shutter 143 so as to deliver the printed ticket to the customer. Hence, through the use of the trap valve or shutter 143 and its operating mechanism, each customer is required to set or prime the machine for use by the next customer before he can obtain his ticket. This method of operating quite effectively prevents attempts to "beat" the machine through improper manipulation thereof.

As already noted, the insertion of a coin will release the stop or lock arm 122 and then the spring 140 will move it over the stop pin 121 and arm gear 119 (see Figs. 4 and 8), so that the actuating shaft 66 will be operated, provided the power operated member or lever 99 (see Fig. 9) has been re-set and the spring 115 tensioned. If, however, the power spring has not been re-set by the previous user of the machine, nevertheless since the actuating mechanism is released as described, the machine can be properly operated, it only being necessary that the user of the machine operate the hand lever 92 to tension the motor spring 115. Of course, he will also have to again re-set the spring at the end of the operation to effect the delivery of the printed ticket.

I have herein shown and described one simple and practical mechanism for carrying out the stated purposes and objects of the invention; but various changes in the arrangement and construction of parts may be made without departing from the principle of the invention, and I, therefore, reserve such variations, modifications, and mechanical equivalents as fall within the spirit and purview of the appended claims.

I claim—

1. In a machine of the character described, the combination with a cabinet, of article dispensing mechanism in said cabinet, a spring for actuating said dispensing mechanism, manually operable means for tensioning said spring, releasable means for locking said spring in tensioned condition, and means controlling the issuance of articles from said cabinet actuated by said spring-tensioning means.

2. In a machine of the character described, the combination with a cabinet, of article dispensing mechanism in said cabinet, a spring for actuating said dispensing mechanism, manually operable means for tensioning said spring, releasable means for locking said spring in tensioned condition, a shutter controlling the issuance of articles from said cabinet, and means for opening said shutter actuated by said spring-tensioning means during the final part of the working movement of said spring-tensioning means.

3. In a machine of the character described, the combination with a cabinet, of article dispensing mechanism in said cabinet, a spring for actuating said dispensing mechanism, manually operable means for tensioning said spring, releasable means for locking said spring in tensioned condition, a shutter controlling the issuance of articles from said cabinet, means for opening said shutter actuated by said spring-tensioning means during the final part of the working movement of said spring-tensioning means, and a spring acting to close said shutter during the idle or return movement of said spring-tensioning means.

4. In a machine of the character described, the combination with a cabinet, of article dispensing mechanism in said cabinet, a motor spring, transmission mechanism driven by said motor spring for operating said dispensing mechanism, a manually operable member for tensioning said motor spring, releasable means for locking said transmission mechanism against movement under the urge of said motor spring, a shutter controlling the issuance of articles from said cabinet, means for opening said shutter during the final part of the working movement of said manually operable member, and a spring operative to close said shutter during the idle or return movement of said manually operable member.

5. In a machine of the character described, the combination with a cabinet, of article dispensing mechanism in said cabinet, a motor spring, transmission mechanism driven by said motor spring for operating said dispensing mechanism, a handle lever for tensioning said motor spring, releasable means for locking said transmission mechanism against movement under the urge of said motor spring, a hinged shutter controlling the issuance of articles from said cabinet, mechanism having a lost motion connection with said handle lever through which said shutter is opened during the final part of the working stroke of said handle lever, and a spring operative to close said shutter during the idle or return stroke of said handle lever.

6. In a machine of the character described, the combination with a cabinet, of article dispensing mechanism in said cabinet, a motor spring, transmission mechanism driven by said motor spring for operating said dispensing mechanism, a handle lever operative on a downward stroke to tension said motor spring, releasable means for locking said transmission mechanism against movement under the urge of said motor spring, a hinged shutter controlling the issuance of articles from said cabinet, lever and link mechanism having a lost motion pin-and-slot connection with said handle lever through which said shutter is opened during the final part of the downward stroke of said handle lever, and a spring operative to close said shutter during the upward stroke of said handle lever.

7. A specific embodiment of claim 1, wherein the dispensing mechanism includes a ticket tape feed device and a cutter for successively severing individual tickets from the ticket tape.

8. In a machine of the class described, the combination of a printer mechanism, means including a single power actuated member for operating said printer mechanism, a releasable lock for holding said means against operation, means for delivering the printed article, and manually operable means for storing energy in said power actuated member and for subsequently effecting the operation of the article delivery means.

9. In a printing scale, the combination of a weighing mechanism, cooperating article feeding and printing mechanisms, means including a common power-actuated member for operating said article feeding and printer mechanisms, a releasable detent for holding said means against operation, means for delivering the printed article, and a member manually operable independently of the weighing mechanism for storing energy in said power actuated member and for effecting the operation of the article delivery means at the end of its movement.

10. In a printing scale, the combination of a weighing mechanism, a cooperating article feeder and printer, means including a common power-actuated member for operating said feeder and printer, a releasable lock for said means, a member manually operable independently of said weighing mechanism for resetting said power actuated member to store energy therein, and associated devices for preventing the operation of said power member unless completely reset.

11. In a printing scale, the combination of a weighing mechanism, a cooperating article feeder and printer, means including a single power-actuated member for operating said feeder and printer, a releasable lock for said means, a member manually operable independently of said weighing mechanism for resetting said power actuated member to store energy therein, associated devices for preventing the operation of said power actuated member unless completely reset, and means operated upon the complete resetting of said power actuated member for delivering the printed article.

12. In a printing scale, the combination of a weighing mechanism, a cooperating feeder, printer and cutter for a ticket tape, motor-actuated means for operating said printer, feeder and cutter in the order named, a releasable lock for said operating means, means manually operable independently of said weighing mechanism for resetting said motor-actuated means and storing energy therein, and associated devices for preventing the operation of said motor actuated means unless completely reset.

13. In a printing scale, the combination of a weighing mechanism, a cooperating feeder, printer and cutter for a ticket tape, motor actuated means for operating said printer, feeder and cutter in the order named, a releasable lock for said motor-actuated means, means manually operable independently of said weighing mechanism for resetting said motor-actuated means and storing energy therein, associated devices for preventing the operation of said motor-actuated means unless completely reset and means operated upon the complete resetting of said motor-actuated means for effecting delivery of the printed articles.

14. In a printing scale, the combination of a weighing mechanism, cooperating article feeding and printing mechanisms, actuating means for said article feeding and printing mechanisms, a releasable lock for said means, an operating member for said actuating means, a spring for effecting the working stroke of said operating member, means for returning said operating member to store energy in said spring, and a one-way connection between said member and said actuating means for rendering said member inoperative unless completely restored.

15. In a printing scale, the combination of a weighing mechanism, article feeding and printing mechanisms, releasably locked actuating means for said article feeding and printing mechanisms, a power member for said actuating means, a spring for effecting the working movement of said member, means manually operable for restoring said member to tension said spring and a coin-controlled member for releasing said actuating means and adapted to be operated to release said actuating means either before or after said spring is tensioned.

16. In a printing scale, the combination of a weighing mechanism, co-operating article feeding and printing mechanisms, a common actuating shaft for effecting the operation of said article feeding and printing mechanisms, a coin-controlled lock for holding said shaft against operation, a power actuated member for effecting the operation of said shaft, and means manually operable independently of the weighing mechanism for re-setting and storing energy in said power actuated member.

17. In a printing scale, the combination of a weighing mechanism, co-operating article feeding and printing mechanisms, a common actuating shaft for effecting the operation of said article feeding and printing mechanisms, a coin-controlled lock for holding said shaft against operation, a power actuated member for effecting the operation of said shaft, and a member manually operable independently of the weighing mechanism for storing energy in said power actuated member, and means operated by said manually operable member at the end of its movement for effecting the delivery of the printing article.

18. In a printing scale, the combination of a weighing mechanism, co-operating article feeding and printing mechanisms, actuating means for said article feeding and printing mechanisms, an operating member for said actuating means, a spring for effecting the working stroke of said operating member, a releasable lock for said actuating means, means independent of the weighing mechanism for re-setting said operating member and storing energy in said spring, and means including a one-way connection between said member and said actuating means for rendering said member inoperative unless completely re-set.

19. In a printing scale, the combination of a weighing mechanism, co-operating article feeding and printing mechanisms, an actuating shaft having means for successively effecting the operation of said article printing and feeding mechanisms, a coin-controlled lock for said shaft, an operating member for said shaft, a spring for effecting the working stroke of said operating member, means manually operable independently of the weighing mechanism for re-setting said operating member to store energy in said spring, and means including a one-way connection between said member and said shaft for rendering said member inoperative unless completely re-set.

20. In a printing scale, the combination with a weighing mechanism, of a cooperating feeder, printer and cutter, for a ticket tape, means for actuating said printer, feeder and cutter, in the order named, a vibratory power member effective upon its forward working stroke to operate said actuating means, means manually operable independently of the weighing mechanism for effecting the return movement of said power member and for storing energy therein, associated devices for rendering said member inoperative unless its return movement is completed, and means operable upon the complete return movement of said member for effecting the delivery of the printed article.

21. In a printing scale, the combination with a weighing mechanism, of cooperating article feeding and printing mechanisms, actuating means for said article feeding and printing mechanisms, a vibratory operating member for said actuating means, a spring for effecting the forward working stroke of said operating member, manually operable means independent of the weighing mechanism for effecting the return movement of said operating member and storing energy in said spring, and means including a one-way connection between said member and said actuating means for rendering said member inoperative unless its return movement is completed.

THOMAS W. B. WATLING.